United States Patent [19]
Kobayashi et al.

[11] Patent Number: 4,816,841
[45] Date of Patent: Mar. 28, 1989

[54] OPTICAL RECORDING MEDIUM

[75] Inventors: Hideki Kobayashi; Minoru Ikeda, both of Kurashiki; Koichi Saito, Okayama; Shiro Nagata; Koichi Horino, both of Kurashiki, all of Japan

[73] Assignees: Kuraray Co., Ltd., Kurashiki; Kuraray Plasmon Data Systems Co., Ltd., Osaka, both of Japan

[21] Appl. No.: 71,078

[22] Filed: Jul. 8, 1987

[30] Foreign Application Priority Data

Jul. 11, 1986 [JP] Japan ................... 61-164275

[51] Int. Cl.$^4$ ............................. G01D 15/10
[52] U.S. Cl. ................. 346/76 L; 346/135.1
[58] Field of Search ............. 346/135.1, 76 L

[56] References Cited

U.S. PATENT DOCUMENTS

| 4,315,269 | 2/1982 | Bloom et al. | 346/135.1 |
| 4,318,112 | 3/1982 | Kivits et al. | 346/135.1 |
| 4,405,706 | 9/1983 | Takahashi et al. | 346/135.1 |
| 4,578,788 | 3/1986 | Ahn et al. | 346/135.1 |

Primary Examiner—E. A. Goldberg
Assistant Examiner—Lincoln Donovan
Attorney, Agent, or Firm—Oblon, Fisher, Spivak, McClelland & Maier

[57] ABSTRACT

An optical recording medium which is made up of a plastic substrate having a surface of minute roughened structure and a metal thin film formed on the substrate and is capable of strongly absorbing laser light of a specific wavelength region, thereby writing data on the medium. The optical recording medium is characterized by an intermediate layer interposed between the plastic substrate and the metal thin film, the intermediate layer having a higher melting point or lower thermal conductivity than the metal thin film and having a thinner average thickness than the metal thin film. The optical recording medium has a definite recording threshold value and permits stable recording with a high CNR by using a broadly ranged recording power.

19 Claims, 2 Drawing Sheets

OPTICAL RECORDING MEDIUM

BACKGROUND OF THE INVENTION

1. Field of the Invention

The present invention relates to an optical recording medium to record and read information by means of a laser beam. More particularly, the present invention relates to an optical recording medium which is made up of a plastic substrate formed by injection molding, injection-compression molding, compression molding, or photopolymer process (2P process) and a reflecting layer of metal thin film formed on the substrate. The optical recording medium has a definite threshold value and is capable of stable recording over a broad range of recording power. In addition, the optical recording medium has superior recording stability and keeps the recording sensitivity unchanged over a long period of time.

2. Discussion of the Background

Optical recording media to record and read information by means of a laser beam are rapidly becoming practical on account of the recent development of fundamental technology on semiconductor lasers, recording materials, and film making processes and also by virtue of their ability to record a large amount of information. For an optical recording medium to be able to record information, a phase change leading to an optical change should take place at the part struck with a laser beam. Bubble making, pitting, and amorphous state-crystalline state transfer are some of the recording methods proposed so far.

An optical recording medium made up of a plastic substrate having a surface of minute roughened structure and a metal thin film formed on the substrate is known. Also known is an optical recording medium made up of a plastic substrate having a smooth surface and a metal thin film formed on the substrate. The advantage of the former is that recording is possible with a low power because the laser beam for recording is efficiently absorbed. This optical recording medium is disclosed in U.S. Pat. No. 4,616,237.

Conventional optical recording media have the following disadvantages. When recordings are made with a low recording power, the recording threshold value is not definite and the CNR (carrier-to-noise ratio) is gradually changed by the reading light. On the other hand, recordings with a high recording power form such large pits that cross-talk occurs between adjacent pits or cracking occurs in pits. All this leads to a decrease of the CNR. To avoid this, it is necessary to perform recording with a recording power in a narrow range. Meeting this requirement needs a more sophisticated drive unit.

Moreover, with the conventional optical recording medium, the recording characteristics change with time and the record stability is not satisfactory. In other words, when the recording medium is stored in an adverse environment, the recording threshold value and CNR change.

SUMMARY OF THE INVENTION

Accordingly, it is an object of the present invention to provide an optical recording medium which has a definite threshold value and capability of stable recording over a broad range of recording power and keeps superior recording stability even in an adverse environment.

This and other objects which will become apparent from the following specification have been achieved by the optical recording medium of the present invention which comprises (i) a plastic substrate, one surface of the substrate having a roughened structure, (ii) an intermediate layer on the roughened surface, and (iii) a metal thin film on the intermediate layer, wherein the film is capable of absorbing laser light, and wherein the intermediate layer has a higher melting point or lower thermal conductivity than the metal thin film and has a thinner average thickness than the metal thin film.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
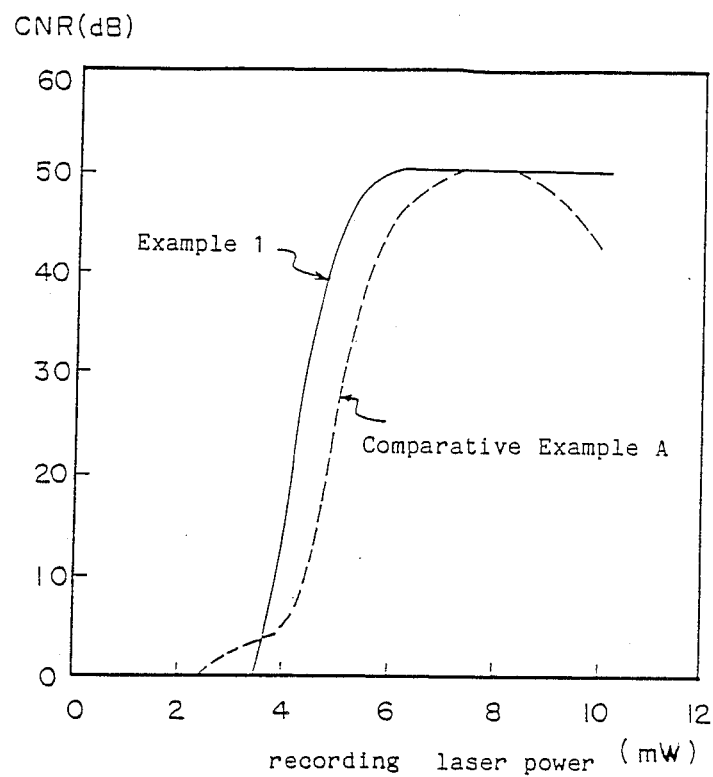
FIG. 1 is a diagram showing the relationship between the recording laser power and the CNR measured in Example 1 and Comparative Example A.

The present invention is an optical recording medium which is made up of a plastic substrate having a surface of minute roughened structure and a metal thin film formed on the substrate and is capable of strongly absorbing laser light of a specific wavelength region, thereby writing data on the medium. The optical recording medium is characterized in that an intermediate layer is interposed between the plastic substrate and the metal thin film, the intermediate layer having thermal characteristic properties different from those of the metal thin film and an average thickness smaller than that of the metal thin film.

The optical recording medium of the invention is made up of a plastic substrate having a surface of minute roughened structure and a metal thin film formed on the substrate, with an intermediate layer interposed between the substrate and the metal thin film. It has a definite recording threshold value and capability of stable recording over a broad range of recording power and keeps superior recording stability even in an adverse environment.

The recording medium of the invention is made up of a plastic substrate having a surface of minute roughened structure and a metal thin film formed on the substrate. This basic structure can be obtained according to the process disclosed in, for example, U.S. Pat. No. 4,616,237.

The substrate may be produced from any plastic which undergoes thermal decomposition or heat distortion at the part struck with recording laser light. Examples of such plastics include polymethyl methacrylate (PMMA) and copolymers thereof, polycarbonates (PC), polyesters, polyolefins, and polyamides which have good transparency.

The laser source is not specifically limited; but a semiconductor laser is preferable to make the drive unit compact. The wavelength of the laser is preferably 750–850 nm. The power for the recording laser is preferably 1–10 mW.

The minute roughened structure on the surface of the plastic substrate can be easily produced by forming the substrate by injection molding, injection-compression molding, compression molding, or photopolymer process (2P process) with a mold in which the inner surface has a minute roughened surface structure.

The minute roughened structure strongly absorbs the laser light a of prescribed wavelength region, thereby facilitating the writing with the laser beam. The roughened structure should preferably be such that the regular pitch (cycle) measured in the direction parallel to the average surface level is smaller than the wavelength of the laser light for writing and reading, and the depth is about 0.05 to 1 μm. If the cycle in the horizontal direction is greater than the wavelength of the laser light or if the depth is smaller than 0.05 μm, the substrate needs as much recording power as a smooth surface substrate. In other words, such a substrate does not produce the effect of roughened structure. On the other hand, if the depth is greater than 1 μm, the substrate efficiently absorbs the recording laser light but ha the disadvantage that it cannot be produced in a short time with good reproducibility.

The metal thin film should preferably be produced from a metal having a melting point higher than 400° C. Metals having a melting point lower than 400° C. have an advantage that recording is possible with a recording laser of low power; but the advantage is offset by the disadvantage that the range of recording power is narrow, the metal film cracks, and the bubbles on the metal film are deformed during storage. The upper limit of the melting point is not specified; but metals with an excessively high melting point require a high power of recording laser and detract from the feature of the roughened surface structure. Metals having a melting point of about 2000° C. are preferable. Examples of such metals include platinum, gold, aluminum, chromium, titanium, iron, nickel, silver, copper, etc. and alloys thereof. The metal thin film should preferably be 5–200 μm thick. Excessively thin film lacks strength and cracks at the time of recording; and excessively thick film requires a high power for the recording laser and detracts from the feature of the roughened surface structure.

The intermediate layer used in the invention should have the thermal characteristic properties of melting point and/or thermal conductivity which are different from those of the metal thin film. If the intermediate layer has a higher melting point or lower thermal conductivity than the metal thin film, the resulting recording medium has a definite threshold value and performs stable recording over a broad range of recording power.

The metal thin film should preferably be made of platinum because of its ductility, high stability, and good handling properties. In the case where the metal thin film is made of platinum, the intermediate layer may be made of a material having an extremely high melting point or a material having an extremely low thermal conductivity. The former is exemplified by chromium, vanadium, and tantalum, and the latter, titanium, silicon dioxide, vanadium, and tantalum. Among them, vanadium and tantalum are preferred and produce the best effect. These materials are usually metals. Semi-metals and the oxides thereof can also be used in the invention however. Table 1 shows the typical physical properties of the materials that can be used in the invention.

TABLE 1

| Material | Melting point (°C.) | Thermal conductivity (cal/m.s.°C.) |
| --- | --- | --- |
| Pt | 1772 | 0.174 |
| Cr | 1857 | 0.227 |
| Au | 1064 | 0.70 |
| Ni | 1453 | 0.21 |
| Al | 660 | 0.57 |
| SiO$_2$ | 1470 | 0.0255–0.0148 |
| Ti | 1660 | 0.053 |
| V | 1847 | 0.05 |
| Ta | 2996 | 0.13 |

The intermediate layer used in the invention should be thinner than the metal thin film in order that the intermediate layer does not greatly change the optical properties (reflectivity and absorptivity) of the optical recording medium made up of a plastic substrate and a metal reflecting film. The thickness of the intermediate layer is not specifically limited. The lower limit may be properly selected according to the material used. An average thickness greater than 1 nm is preferable for an adequate effect. The upper limit, which depends on the metal thin film, is usually lower than 100 nm, preferably lower than 50 nm. The intermediate layer is not required to be completely continuous; i.e., it may be of island structure. This is why the layer thickness is expressed as "average thickness".

It is not yet known how the effect of the invention is produced. It is considered that the intermediate layer helps the metal thin film to undergo thermal deformation upon striking with a recording laser beam, by the effects of changing the mutual interaction of the interface thereof, in view of the fact that the desired effect is not produced simply by changing the thickness of the metal thin film and the effect is produced even in the case where the intermediate layer has very thin average thickness. It is also considered that the low thermal conductivity of the intermediate layer permits the striking laser light to effectively act on the plastic substrate, bringing about thermal decomposition and heat distortion, without dissipation in the horizontal direction. The high melting point of the intermediate layer will prevent the metal thin film from cracking when data is written with a laser beam of high power.

In the case of conventional optical recording media, the sensitivity and CNR are increased by adding a reflection layer, absorption layer, or interference layer to a flat plastic substrate. These additional layers impart desired optical properties to the recording medium. This technology is described in Japanese Patent Laid-open Nos. 159692/1982 and 186243/1982. Surprisingly, the optical recording medium of the invention is basically different from the conventional ones in that the effect is produced regardless of the optical properties such as absorption and interference.

U.S. Pat. No. 4,360,895 discloses an optical recording medium having at least two metal layers which have very different coefficients of thermal expansion. In this recording medium, an unerasable permanent memory is produced by deforming the metal layer instead of pitting the metal layer. The deformation is caused by the bimetal effect ascribed to the difference in the coefficients of thermal expansion. This technology is effective only when the substrate has a completely flat surface, and is not effective when the substrate has a surface of minute roughened structure. Therefore, the present invention is totally different from the prior art just mentioned above, as will be demonstrated in Examples and Comparative Examples that follow. In other words, the effect of the invention is not produced at all with the Pt/Au system, Pt/Ni system, and Pt/Al system in which the constituent metals have greatly different coefficients of thermal expansion. Rather, these systems become poor in recording characteristics when the intermediate layer is added. On the other hand, the effect of the invention is produced in the Pt/Ti system although almost no bimetal effect is expected. These finds are quite contrary to the teaching of U.S. Pat. No. 4,360,895. These metals have the following coefficients of thermal expansion:

Pt: $0.90 \times 10^{-5} K^{-1}$
Au: $1.41 \times 10^{-5} K^{-1}$
Ti: $0.89 \times 10^{-5} K^{-1}$
Al: $2.35 \times 10^{-5} K^{-1}$
Ni: $1.28 \times 10^{-5} K^{-1}$ The metal thin film and the intermediate layer may be formed in the usual way such as sputtering, vacuum deposition, and ion plating. The process is not specifically limited.

The optical recording medium made up of a plastic substrate and a metal thin film and an intermediate layer formed on the substrate should preferably reflect 5-60% of the incident laser light entering through the plastic substrate when recording is not yet made. With a reflectivity lower than 5%, stable tracking is not performed for writing and reading. Conversely, with a reflectivity higher than 60%, the recording medium does not absorb the laser light for recording, in which case recording is impossible at all or a high power is required for recording.

The optical recording medium of the abovementioned structure is capable of permanent recording when struck with laser light, because the minute roughened structure on the surface strongly absorbs the laser light, bringing about the partial decomposition of the plastic substrate and the evolution of gas which forms bubbles as the permanent deformation of the metal thin film. The reflectivity increases at the parts where bubbles are formed, and the permanent recording is made in this way. The optical recording medium of the invention may be protected with a known protective layer.

Other features of the invention will become apparent in the course of the following description of exemplary embodiments which are given for illustration of the invention and are not intended to be limiting thereof.

EXAMPLES

Example 1 and Comparative Example A

A polycarbonate disc (substrate) having an inside diameter of 15 mm, an outside diameter of 130 mm, and a thickness of 1.2 mm was made by injection molding. The disc has a minute roughened surface structure in the form of sinusoidal waves with a regular cycle of 0.3 μm measured in the direction parallel to the average surface level and a depth of 0.1 μm. The disc has a glass transition point of 140° C. measured by the DSC (differntial scanning calorimeter) method. The disc was coated with a 4 nm chromium film by sputtering. The chromium layer was then coated with a 15 nm thick platinum film by using the same sputtering apparatus to obtain an optical recording medium. It has a reflectivity of 18% which is satisfactory for focusing and tracking with a laser beam having a wavelength of 830 nm.

Recording was performed with a semiconductor laser while changing the recording laser power gradually from 1 mW to 10 mW, and the CNR was measured. In Comparative Example A, an optical recording medium made up of only a plastic substrate and a platinum reflecting layer (without the chromium layer) was prepared, and the CNR was measured. The results are shown in FIG. 1.

The optical recording medium was placed in a thermo-hygrostat at 40° C. and 95% relative humidity (RH) for 1000 hours (aging). Recording was performed with a semiconductor laser having a wavelength of 830 nm, in the same manner as mentioned above. The laser power was 9 mW. The CNR was compared with the CNR measured before aging to evaluate the recording stability.

It is noted from FIG. 1 that with the optical recording medium of Example 1, the CNR rapidly rises in the lower power region and hence the recording threshold value is definite, and yet the CNR does not decline in the high power region. This indicates that recording with a broad range power is possible. As for recording stability, the CNR decreased by 5 dB in the case of the recording medium without the intermediate layer (in Comparative Example A), whereas the CNR remained totally unchanged in the case of the recording medium having the intermediate layer (in Example 1).

After recording, the optical recording medium was aged in a thermo-hygrostat at 40° C. and 95% for 1000 hours and the CNR in reading was measured. No decrease in CNR was observed. This result indicates that the optical recording medium of the invention remains stable after recording.

Examples 2 to 5 and Comparative Example B

Optical recording media were prepared in the same manner as in Example 1, except that the intermediate layers of different thicknesses (as shown in Table 2) were made from Cr or SiO$_2$ by sputtering. They are examined in the same manner as in Example 1.

TABLE 2

| Example No. | Intermediate layer | | Metal thin layer | |
|---|---|---|---|---|
| | Material | Thickness (nm) | Material | Thickness (nm) |
| 2 | Cr | 2 | Pt | 15 |
| 3 | Cr | 10 | Pt | 15 |
| 4 | SiO$_2$ | 2 | Pt | 15 |
| 5 | SiO$_2$ | 4 | Pt | 15 |
| Comparative Example B | SiO$_2$ | 20 | Pt | 15 |

The optical recording media in Examples 2 to 5 produced the same effect as shown in FIG. 1, with the CNR unchanged before and after exposure to high humidity. In the case of the optical recording medium in Comparative Example B, the recording threshold value was not definite and the CNR declined even in the high power region. After exposure to high humidity, the CNR decreased by 5 dB.

Examples 6 and 7 and Comparative Examples C to E

Optical recording media were prepared in the same manner as in Example 1, except that the intermediate layer was made from Ti, V, Ni, Al, or Au by sputtering and a 12 nm thick platinum film was formed thereon as shown in Table 3. They are examined in the same manner as in Example 1.

TABLE 3

| Example No. | Intermediate layer | | Metal thin layer | |
|---|---|---|---|---|
| | Material | Thickness (nm) | Material | Thickness (nm) |
| 6 | Ti | 6 | Pt | 12 |
| 7 | V | 6 | Pt | 12 |
| Comparative Example C | Ni | 6 | Pt | 12 |
| Comparative Example D | Al | 6 | Pt | 12 |
| Comparative Example E | Au | 6 | Pt | 12 |

Figure 2:
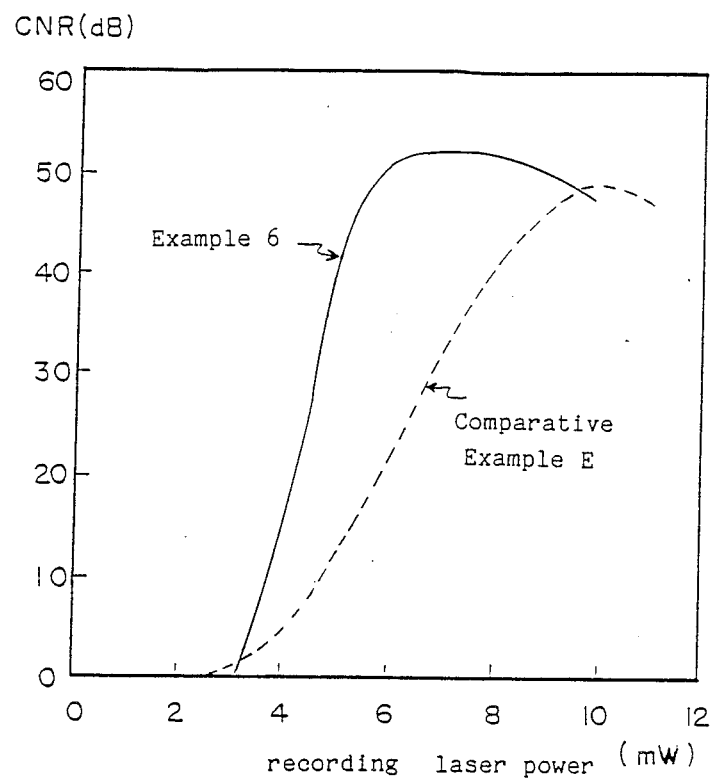
FIG. 2 is a diagram showing the relationship between the recording laser power and the CNR measured in Example 6 and Comparative Example E.

The optical recording media in Examples 6 and 7 produced the same effect as shown in FIG. 1, with the CNR unchanged before and after exposure to high humidity. In the case of the optical recording medium in Comparative Examples C to D, the recording threshold value was not definite and the CNR greatly declined even in the high power region. FIG. 2 shows the results obtained in Example 6 and Comparative Example E.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An optical recording medium consisting essentially of:
   (i) a plastic substrate, with one surface of said substrate having a roughened structure,
   (ii) an intermediate layer comprising a member selected from the group consisting of platinum, gold, aluminum, chromium, titanium, iron, nickel, silver, copper, vanadium, tantalum and silicon dioxide on said roughened surface, and
   (iii) a metal thin film on said intermediate layer, wherein said recording medium is capable of absorbing laser light, and wherein said intermediate layer has a higher melting point or lower thermal conductivity than said metal thin film and wherein said intermediate has a thinner average thickness than said metal thin film.

2. The optical recording medium of claim 1, wherein said plastic substrate has a regularly roughened surface structure having a regular pitch, said regular pitch having a depth of about 0.05–1.0 micron and wherein said regular pitch measured in the direction parallel to the average surface level is smaller than the wavelength of the laser light used for writing.

3. The optical recording medium of claim 1, wherein said medium has a reflectivity of 5–60% before writing when contacted with laser light entering through said plastic substrate.

4. The optical recording medium of claim 1, wherein said roughened structure is formed by a method selected from the group consisting of injection molding, injection-compression molding, compression molding, and photopolymer processes.

5. The optical recording medium of claim 1, wherein said metal thin film is a metal having a melting point greater than 400° C.

6. The optical recording medium of claim 5, wherein said metal thin film comprises a metal selected from the group consisting of platinum, gold, aluminum, chromium, titanium, nickel, silver, copper and alloys thereof.

7. The optical recording medium of claim 1, wherein said intermediate layer comprises a metal having a melting point higher than the metal comprising said metal thin film.

8. The optical recording medium of claim 1, wherein said intermediate layer comprises a metal having a thermal conductivity lower than the metal comprising said metal thin film.

9. The optical recording medium of claim 1, wherein said intermediate layer comprises a metal, a semimetal or an oxide thereof.

10. The optical recording medium of claim 1, wherein said metal thin film comprises platinum and said intermediate layer comprises a member selected from the group consisting of chromium, titanium, vanadium, tantalum and silicon dioxide.

11. The optical recording medium of claim 1, further comprising a protective layer on said metal thin film.

12. The optical recording medium of claim 1, wherein said plastic substrate comprises a thermoplastic resin.

13. The optical recording medium of claim 12, wherein said thermoplastic resin is selected from the group consisting of polyester resins, polyolefin resins, polyamide resins, polycarbonate resins and polymethacrylate resins.

14. The optical recording medium of claim 1, wherein said metal thin film has a thickness of 5–200 nm and said intermediate layer has an average thickness of 1–100 nm.

15. The optical recording medium of claim 1, wherein said metal thin film has a thickness of 10–200 nm and said intermediate layer has an average thickness of 1–50 nm.

16. The optical recording medium of claim 1, wherein said metal thin film has a thickness of 10–200 nm and said intermediate layer has an average thickness of 1–10 nm.

17. The optical recording medium of claim 1, further comprising information recorded on said optical recording medium for use in an optical readout system employing a semiconductor laser beam.

18. A process for making permanent recordings on the optical recording medium of claim 1, comprising the step of:
   irradiating said optical recording medium with a laser beam, whereby said laser beam induces local decomposition of the roughened surface of said plastic substrate, said decomposition comprising the formation of gas bubbles having an increased reflectivity.

19. The process of claim 18 wherein said laser beam is a semiconductor laser beam.

* * * * *